R. M. SHURTLEFF.
Flexible Pipe-Joint.
No. 128,760.  Patented July 9, 1872.
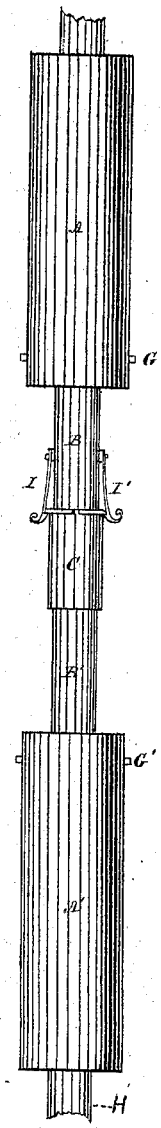
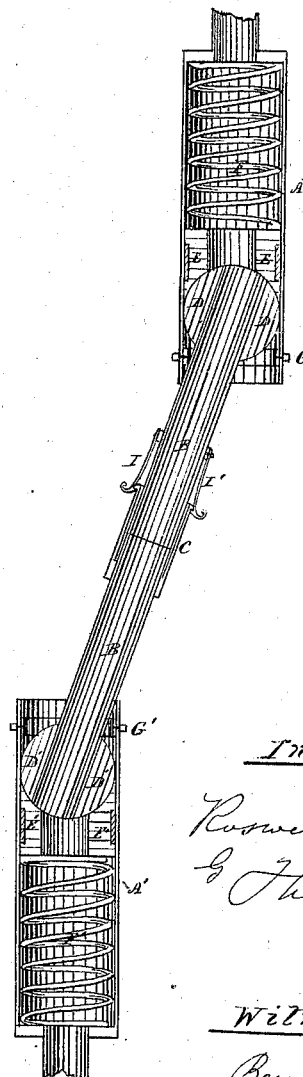

128,760

UNITED STATES PATENT OFFICE.

ROSWELL M. SHURTLEFF, OF HARTFORD, CONNECTICUT.

IMPROVEMENT IN FLEXIBLE PIPE-JOINTS.

Specification forming part of Letters Patent No. 128,760, dated July 9, 1872.

SPECIFICATION.

*To all whom it may concern:*

Be it known that I, ROSWELL M. SHURTLEFF, of Hartford, in the county of Hartford and State of Connecticut, have invented certain new and useful Improvements in Flexible Pipe-Joints; and I do hereby declare that the following is a full, clear, and exact description thereof, whereby a person skilled in the art can make and use the same, reference being had to the accompanying drawing and to the letters of reference marked thereon.

Like letters in the figures indicate the same parts.

My invention consists in a mechanism for connecting the ends of two rigid metallic or other pipes, so that they can be flexible and bend at an angle to each other, or move out of line, and also have a movement to and from each other, to a certain extent, and yet maintain an air-tight interior connection or channel between the two, so as to form an uninterrupted interior tube. The object of my invention is to provide a means of connecting metallic pipes through a train of railway cars, or other similar situations, which shall be flexible and compressible, and at the same time sufficiently tight to convey compressed air or steam, or to maintain a vacuum, for the purpose of conveying heat or power from one car to another.

In the accompanying drawing, Figure 1 represents an outside view of my invention with the pipes and connections in line. Fig. 2 shows a longitudinal section through the middle of the pipes when turned at an angle with each other.

A and A' are the enlarged ends of the pipes H H'. B B' are two smaller pipes, joined together when desired, as will be described. C is a band attached permanently to the pipe B', into which the end of B fits, and is held by the spring clips I I'. D D' are balls on the ends of the pipes B and B'. These balls are of the same diameter as the interior of the enlarged portions A A, and can slide in them backward and forward, but not necessarily air-tight. E E' are pistons, sliding in the pipes A A', and are packed around the edges in any ordinary way, so as to be air or steam-tight. The balls D D' rest in hollow sockets upon the outer side of these pistons, to which they are ground or otherwise fitted air-tight. The pistons are kept constantly pressed against the balls with sufficient force to insure a tight joint by means of the spiral springs F F'. G G' are rings or collars to prevent the balls from being forced out of the tubes when the pipes are disconnected at C. The pistons E E' and the balls D D' have openings through them, so as to make a clear channel through the whole system of pipes.

The operation of my invention is as follows: The pipes A B and contained parts being at the end of the pipe H upon one railway car, and the pipes A' B' and contained parts being at the adjacent end of another car next to it, the end of B is inserted into the connecting piece C, and is held by the clips I I. The ends of the cars can then move laterally or up and down, or crowd together and pull apart, as they usually do when in motion, coupled together in a train. The play of the balls against the sockets in the pistons permits the lateral motion, and the movement of the pistons within the bore of the cylinders permits the endwise motion, maintaining at the same time air-tight joi When it is desired to detach the cars nts. clips I I' are drawn back, and the pipes B and B' are separated.

Any other method of coupling these pipes may be used that will hold them firmly together.

My invention is applicable to conveying air for self-acting air-brakes on railways, or for conveying steam or hot water for heating railway cars, or for any other purpose for which a continuous flexible metallic pipe is applicable.

*Claims.*

What I claim as my invention is—

1. The combination of the ball D, the piston E, and the spring F within the cylinder A, forming a flexible and compressible joint for pipes, substantially as described.

2. The combination of the devices A D E F with the pipes B and B', and the devices A' D' E' F', the whole forming a flexible and compressible connection between two rigid pipes, substantially as described.

ROSWELL M. SHURTLEFF.

Witnesses:
THEO. G. ELLIS,
BEN A. COOKE.